United States Patent [11] 3,602,866

| [72] | Inventor | Erwin J. Saxl |
| | | c/o Tensitron, Inc., Harvard, Mass. 01451 |
| [21] | Appl. No. | 784,816 |
| [22] | Filed | Dec. 18, 1968 |
| [45] | Patented | Aug. 31, 1971 |

[54] FORCE TRANSDUCER
21 Claims, 17 Drawing Figs.

[52] U.S. Cl. ................................................ 338/5,
    73/88.5, 317/246
[51] Int. Cl. ...................................................... G01l 1/22
[50] Field of Search ........................................ 338/2, 5, 6;
    73/88.5, 88.5 SD; 317/246

[56] References Cited
UNITED STATES PATENTS

| 2,423,842 | 7/1947 | McHenry | 338/2 X |
| 2,600,701 | 6/1952 | Statham et al. | 338/4 X |
| 2,711,590 | 6/1955 | Wilcox | 317/246 UX |
| 3,132,319 | 5/1964 | Brooks, Jr. | 338/6 |
| 3,315,203 | 4/1967 | Jacobson | 338/5 |
| 3,433,064 | 3/1969 | Jacobson | 338/5 X |
| 3,471,758 | 10/1969 | Werner | 317/246 |

*Primary Examiner*—Rodney D. Bennett, Jr.
*Assistant Examiner*—Richard E. Berger
*Attorney*—Kenway, Jenney & Hildreth

ABSTRACT: A force transducer having an elongate strain element with a narrowed waist portion formed symmetrically about its longitudinal axis and intermediate its ends to concentrate the applied stress at the waist portion. A hole is formed centrally through the waist portion, the axis of the hole being normal to and intersecting the longitudinal axis of the strain element and strain gages located adjacent the internal perimetric surface of the hole that are responsive to the concentrated stress. The hole may be sealed and isolated from the ambient environment by a readily yieldable plug and electrical outlet which covers the hole.

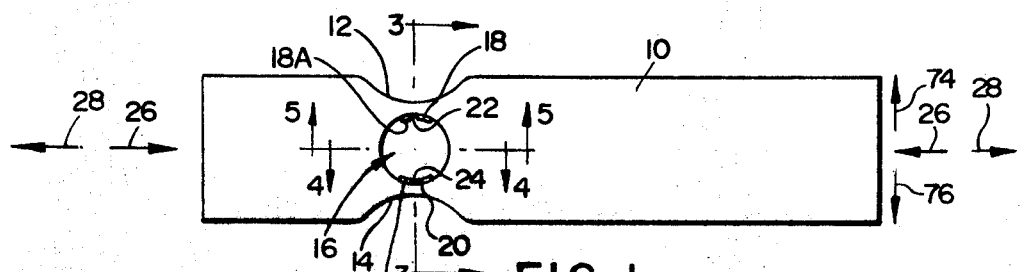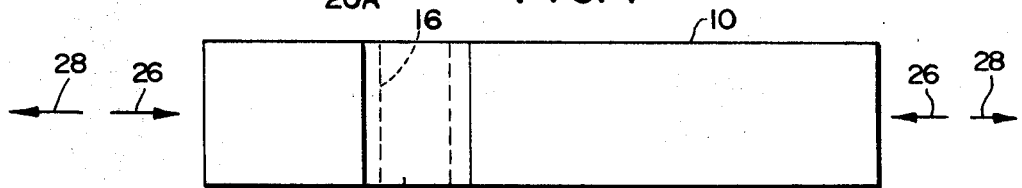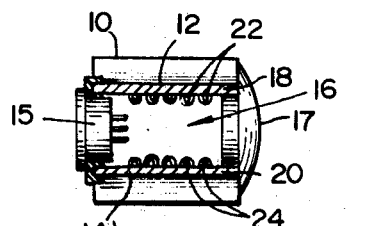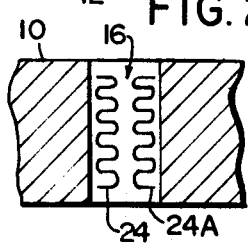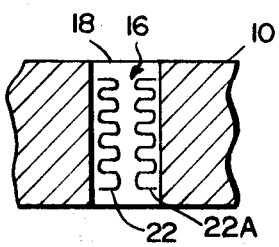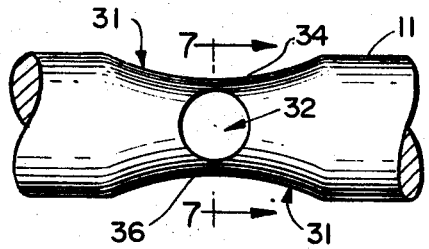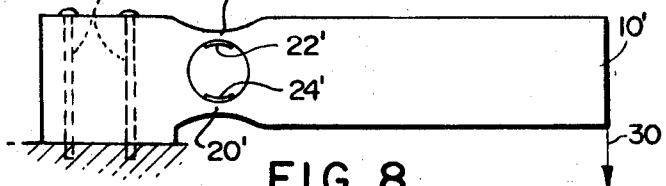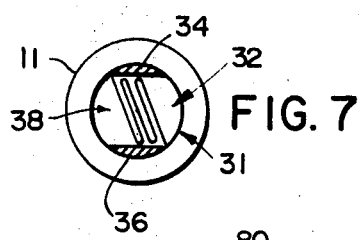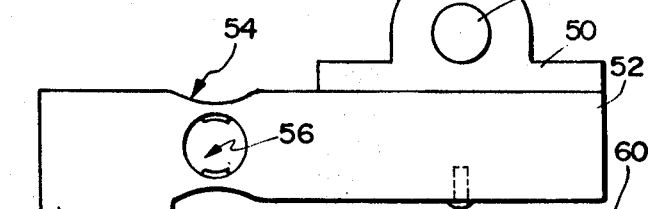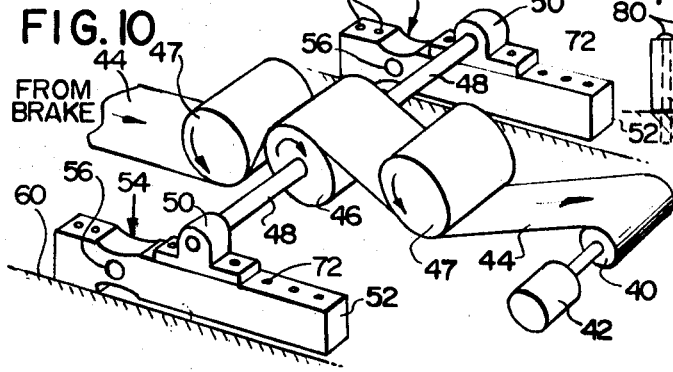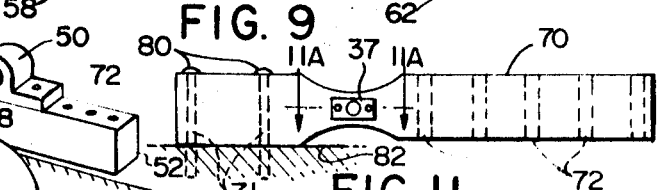

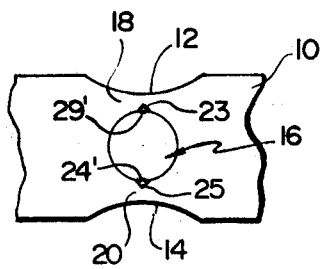
FIG. 12
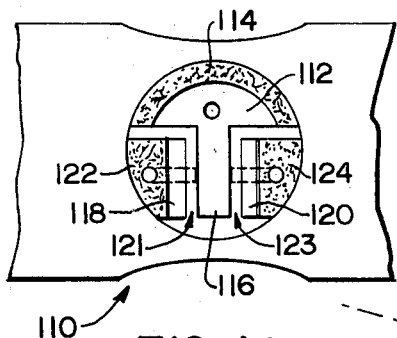
FIG. 14
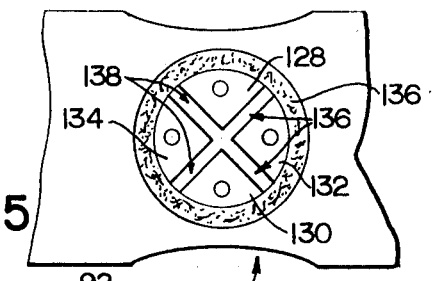
FIG. 15
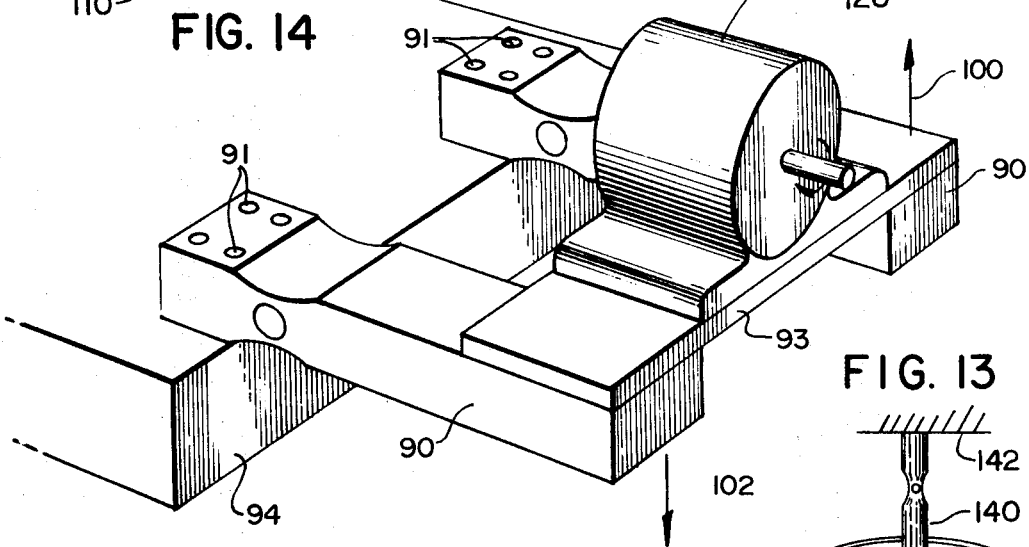
FIG. 13
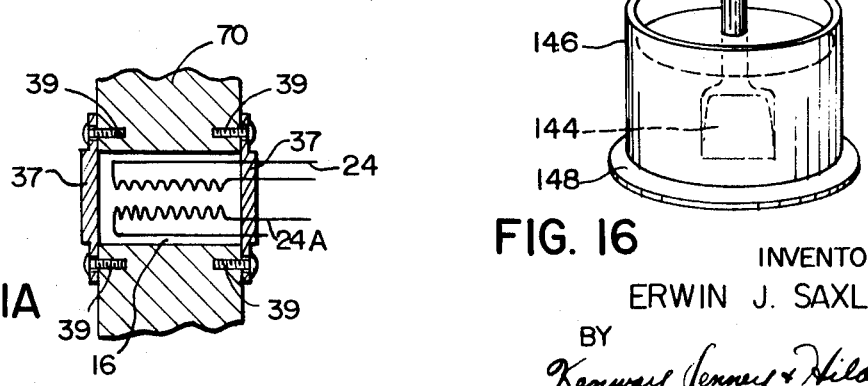
FIG. 11A
FIG. 16
INVENTOR
ERWIN J. SAXL
BY
Kenway, Jenney & Hildreth
ATTORNEYS

FORCE TRANSDUCER

SUMMARY OF THE INVENTION

My invention relates to a transducer for measuring or monitoring a variable load or force. The transducer is of the type in which electrical resistance strain gages are bonded strategically to an elastic strain member which in turn is subjected to the load or force in question. More particularly, my transducer is of the elongate, columnar type and is provided with a transverse hole intermediate the ends of the column with the strain gage elements placed at the regions of maximum stress concentration in the internal perimetric surface of the hole.

Although in many instances an accurate arrangement for determining the stress in a particular structural member by means of electrical resistance strain gages consists of bonding the strain gages directly to the structural member in question, this practice frequently is impractical. It will be appreciated that proper location of strain gages on a structural member as well as calibration of the associated electrical equipment to indicate accurately the strain imposed on the member requires the efforts of highly skilled technicians who are familiar thoroughly with stress analysis, technology and procedures. In order to utilize more efficiently the efforts of such technicians it has become common practice in the art to provide separate load cells or force transducers which may be preassembled by the skilled technicians but which may be connected to the structural member in question by persons having a lesser degree of skill so that the continual presence of the more skilled technicians is not required.

It has been known for some time, in the prior art, to provide an elongated load cell or load column on which strain gage resistance elements or other sensors are bonded to move in unison with the column. In general, however, these load cells have been designed individually to measure a particular type of stress such as pure pull, pure compression or torsion. In accordance with my invention a load cell transducer is provided which is responsive to any or all of these stresses, either singularly or in combination. Thus it is among the objects of my invention to provide a transducer which is highly versatile in that it may be used to respond accurately to different types of stress.

As described below my transducer may be mounted to receive the force in question along its longitudinal axis and such mounting will be referred to as "load column mounting." My transducer, alternatively, may be supported at one or both of its ends to receive the force in question intermediate its ends and along a direction that is substantially normal to the axis of the beam thus to apply a bending moment to the transducer. Such mounting of my transducer will be referred to herein as "beam mounting."

Because of the relatively delicate nature of strain gage elements and other sensors it frequently is desirable to shield or otherwise isolate the strain gages from the ambient environment so that the strain gages may not be structurally damaged or that their sensitivity may not be impaired, for example, by abrasion, conditions of temperature or humidity, corrosive environments and the like. In load columns where the strain gages are bonded to the external surface of the column special enclosures have been provided to isolate and protect the strain gages In some instances the enclosures are filled with inert gases and, in general, are of relatively complicated structure.

Other load cells have been proposed in which the strain gage elements are mounted within a hole formed in the transducer, such as disclosed in U.S. Pat. No. 3,132,319 granted to Brooks, in which the strain gages are isolated by cover plates which cover the open ends of the hole. The use of such cover plates, however, tends to increase the rigidity of the transducer which, in turn, reduces or distorts the strain produced by any given force, thus affecting the accuracy of the device. As described below, my load cell provides a means for isolating the strain gage elements within a hole without affecting adversely the accuracy of the load member by providing readily yieldable plugs at the open ends of the hole which yield in response to forces which are relatively small to comparison with the magnitude of the force to be measured or monitored.

It is a further object of my invention to construct a transducer which is effective to concentrate the stress and consequently the strain in the region of the strain gages. To this end the transducer is provided with a narrow waist portion intermediate its ends, formed symmetrically about the longitudinal axis of the column. The applied stress will be concentrated at the waist portion irrespective of the character of the stress (tension, compression, bending, torsion) or in the direction in which the stress is applied. By constructing the load cell so that the hole to which the strain gages are bonded is disposed at the waist portion, the maximum strain in the load column will take place within the relatively thin web between the waist portion and the internal surface of the hole. Thus, by locating the strain gages within the hole and at the web, a transducer is provided which displays maximum sensitivity while enabling the strain gages to be shielded within the transducer itself that, eliminating the need for elaborate isolation devices.

The concept of a load cell having an internal hole to which strain gages are bonded has been proposed in the prior art as evidenced by the aforementioned Brooks patent. Such load cells, however, have been directed primarily to the cylindrical "proving ring" configuration in which the load cell comprises essentially a ring which is secured within a circular hole formed in that structural member of the system which is to be monitored. These proving rings are effective only in response to pure tensile and compressive stresses which act along a line of action passing diametrically through the proving ring. For example, if the element which is being monitored is subjected to a bending stress so that the maximum strain is located laterally of the diameter of the proving ring, the lateral portions of the proving ring will tend to slip with respect to the member and therefore will not be subjected to the same compressive and tensile bending stresses as the member being measured. The instant invention provides a transducer which is equally responsive to pure tensile or compressive stresses as well as to bending shear and torsional stresses. Thus it is also among the objects of my invention to provide a load cell or transducer which is responsive to torsional stresses as well as to compressive and tensile stresses.

One of the more frequently encountered problems when using axially loaded transducers to sense compression forces is the fact that when the load is comparatively large, the transducer tends to bow longitudinally, thus introducing an unwanted parasitic bending moment.

This is particularly true in transducer arrangements where the load columns are provided with a narrowed down portion at which the stress is concentrated and to which the strain gages are attached at the outer surface of the narrowed down portion. In order to overcome this deficiency, special and somewhat complex parallelizing arrangements have been utilized in the prior art to eliminate or to compensate for the bending moments so that the only strain measured is due to the axially applied stress, thus retaining the load column under essentially linear operating conditions to avoid parasitic deflections which interfere with the accuracy of the transducer. Additionally it will be appreciated that location of the strain gages at the exterior surface of the transducer may require the provision of special covers to protect the sensitive parts. The disclosed transducer eliminates these problems. For example, if my transducer is initially "column mounted" to receive a compressive load along its axis and the transducer tends to bow longitudinally when the load is applied, the mounting for the transducer may be rearranged to a "beam mounting" in which the load in question is received by the transducer intermediate its ends and along a direction that is substantially normal to its longitudinal axis. It will be appreciated that by "beam mounting" the transducer the only strain resulting from the applied load will be of a bending character which the strain gage may accurately measure. Inasmuch as there are no stresses other than bending, errors resulting from extraneous, parasitic stresses are eliminated.

In an alternative embodiment of my invention the internal perimetric surface of the hole is provided with secondary notches at the web regions of the transducer with the strain gage elements attached to and nested within the notches. This arrangement is effective both to increase locally the stress concentration at the gage locations and to mechanically strengthen and protect the gage elements.

An additional feature of my invention is directed to an arrangement to enable the sensitivity of the transducer to be varied, in the field, without repositioning or otherwise interfering with the location of the preattached strain gages. To this end I have provided a "beam mounted" transducer which bends longitudinally in response to the force to be measured. This embodiment of my transducer is supported at one or both of its ends and means are provided for varying the distances between the supports, the waist portion and the location at which the force is applied, thereby to vary the magnitude of the bending stress in the beam. The waist portion of the transducer may be machined or otherwise reduced dimensionally to increase the stress concentration at the waist portion and hence the sensitivity of the transducer. This feature of my invention is particularly advantageous in environments wherein the load in question may vary from that range of operation for which the transducer was originally designed.

Other objects and advantages of my invention will be apparent from the following detailed description with reference to the accompanying drawings in which like numbers refer to similar parts and wherein:

FIG. 1 is a slide elevation of one embodiment of my load cell which is responsive to pure tensile and compressive as well as bending stress;

FIG. 2 is a plan view of the load cell shown in FIG. 1;

FIG. 3 is a sectional view through the waist portion as seen along the line 3—3 of FIG. 1;

FIG. 4 is a view through the gage hole as seen along the line 4—4 of FIG. 1;

FIG. 5 is a view similar to that of FIG. 4 as viewed along the line 5—5 of FIG. 1;

FIG. 6 is an illustration of an alternative embodiment of my transducer particularly adapted to sense torsional stresses;

FIG. 7 shows the transducer of FIG. 6 as viewed along the lines 7—7 of FIG. 6;

FIG. 8 is an illustration of a transducer in accordance with my invention which is cantilever mounted to be responsive to bending stresses as well as to pure tensile or compressive stresses;

FIG. 9 shows a transducer similar to that of FIG. 8 and illustrating its application in sensing bending stresses particularly in combination with pillow-blocks;

FIG. 10 illustrates a pillow block transducer of adjustable mechanical advantage to sense the tension in a web;

FIG. 11 is an illustration of a mechanically adjustable transducer in which the hole is covered by plates secured to the neutral axis of the transducer;

FIG. 11A is a view of the transducer of FIG. 11 as seen from the line 11A—11A of FIG. 11;

FIG. 12 is a side elevation of a modified transducer having secondary notches formed at the internal perimetric surface of the hole to increase the stress concentration and provide protection for the strain gage elements; p FIG. 13 illustrates my transducers as utilized in a device for measuring reactive torque;

FIGS. 14 and 15 illustrate my invention to utilizing capacitive sensing means; and FIG. 16 is a somewhat schematic illustration of my invention as used in a viscosimeter. As shown in FIGS. 1 and 2 my load cell includes an elongated beam or column 10 having a narrowed waist portion intermediate its ends. The waist portion is defined by the notches 12 and 14 formed symmetrically about and on opposite sides of the longitudinal axis of the beam 10. The notches 12 and 14 preferably are formed so that they merge smoothly and continuously with the remaining surfaces of the beam 10, thus to eliminate sharp corners which would tend to create unwanted discontinuities in the stress pattern. A hole 16 is formed through the beam 10 and is oriented so that its axis parallels to the plane of the notches 12, 14 and is normal intersection to the longitudinal axis of the beam 10 thus to define a pair of narrow webs 18 and 20 between the internal perimetric surface of the hole 16 and the notches 12 and 14. It will be appreciated that when a given load is applied to the beam 10, the greatest concentration of stress will occur within the webs 18 and 20. Strain gages 22, 22A and 24, 24A are bonded securely to the internal perimetric surface of the hole 16 at these portions of the surface which define the webs 18 and 20 so that the strain gages will flex in unison with the webs 18 and 20 and thus be subjected to the maximum strain which is developed within the webs 18 and 20. Thus, when a compressive load is applied to the beam along its longitudinal axis (as indicated by the arrows 26) the maximum compressive strain will develop within the webs 18 and 20 and similarly, when the beam 10 is subjected to a tensile stress 28 along its longitudinal axis the maximum tensile strain will develop within the webs 18 and 20. As later described, when the load is applied to bend the beam in the directions 74 or 76, the gages 22 and 24 simultaneously will be subjected to tension and compression. In accordance with my invention the strain gages 22 and 24 are displaced as far from the longitudinal axis of the beam 10 as is practically possible. This is of importance both when the transducer is "beam mounted" and when it is "column mounted" in order to subject the strain gages 22, 24 to the maximum stress.

As shown in FIG. 12 the internal perimetric surface of the hole may be provided with secondary notches 23 and 25 adjacent the webs 18 and 20. The secondary notches 23, 25 serve a multiple purpose in that they reduce the cross-sectional area at the webs 18 and 20, thereby increasing the stress concentration and, additionally, provide an ideal location for the strain gage elements 22', 22A', 24', 24A' which may be attached to and nested within the secondary notches 23, 25. Locating the strain gage elements within the secondary notches 23, 25 serves additionally to mechanically strengthen and protect the strain gage elements. Furthermore, nesting of the strain gages 22', 24' in intimate contact with the secondary notches 23, 25 increases the thermal conductivity between the gages and the heat conductive column to enhance the effectiveness of the column as a heat sink.

It should be noted that although, in the accompanying figures, the strain gage elements are shown primarily as comprising strain gages of the resistive variety, the invention may be practiced with other strain sensing means such as capacitive sensors, LVDT's, sensing elements incorporating polarized light, unbonded strain gages attached to insulating supports crossing the regions of concentrated stress and other methods known to the art. For example, FIG. 14 shows the use of a capacitive sensing element 110 as used in the force transducer. The element 110 includes a ground electrode 112, bonded to an insulative member 114 which, in turn, is bonded to the internal perimetric surface of the hole 16. An extension 116 of the electrode 112 is disposed substantially normal to the neutral axis of the transducer and protrudes between the positive and negative electrodes 118, 120. The electrodes 118, 120 similarly are bonded securely to the internal perimetric surface of the hole 16 through the insulate of supports 122, 124. It will be appreciated that the spacers 121, 123 between the electrode 112 and the electrodes 118 and 120 provide a capacitive characteristic so that as the transducer is flexed in response to the applied load the gaps between the electrodes will vary, thus varying the capacitance between the electrodes. This variation in capacitance may be monitored readily by suitable electronic instrumentation to provide an indication of the magnitude of the force in question.

FIG. 15 shows another capacitive sensor 126 including the wedge-shaped electrodes 128, 130, 132 and 134 which are bonded to the inner surface of an insulative ring. The ring 136 is bonded to and flexes in unison with the internal perimetric surface of the hole 16. The opposed electrodes 128, 130 are connected to each other and serve as a common ground. The electrodes 132 and 134 are connected to a suitable source of potential so that the spaces 136, 138 defined between adjacent electrodes will display a capacitive characteristic. When the transducer is flexed the capacitance will vary inversely with the square of the distance between adjacent electrodes.

One example of a "beam mounting" is shown in FIG. 8 in which a transducer is provided in accordance with my invention in the form of a cantilevered beam 10' which is secured at one end to a rigid support 27, mounting holes 29 being provided at one end of the beam for this purpose. The force to be monitored (indicated by the arrow 30) is applied to the free end of the beam 10' and creates a tensile stress within the web 18 and its associated sensing elements or foils 22, 22A and a compressive stress within the web 20 and its associated foils 24, 24A. The strain gages 22 and 24 are strained in precise unison with their respective webs 18 and 20 to provide an accurate determination of the magnitude of strain. It should be noted here that if the strain gages 22 and 24 were permitted to slip or were otherwise precluded from straining in exact unison with their associated webs the resulting reading would be inaccurate. This is one of the primary advantages which my transducer exhibits over the conventional "proving ring" load transducers in that, when subjected to a bending stress, the proving ring may tend to slip in the region of maximum strain and thus reflect inaccurately the extent of strain within the web. Additionally, the narrowed-down sections of the conventional "proving ring" load columns may show parasitic flexures which my transducer eliminates.

FIGS. 6 and 7 are illustrative of an alternative embodiment of my invention which is adapted to be responsive primarily to torsional stresses as well as tensile, compressive and bending stresses. This embodiment includes a beam or column 11 of circular cross-sectional shape, as opposed to the square or rectangular cross-sectional shape described thus far. The narrowed waist portion 31 extends completely about the beam 11 and merges smoothly with the opposed ends of the beam 11 so that no sharp corners which would tend to concentrate stress are present. The hole 32 is formed at the most narrow portion of the waist 30 with its axis normal to and intersecting the longitudinal axis of the column 11, thus defining the webs 34 and 36. Strain gages 38 are bonded or otherwise attached to the internal perimetric surface of the hole 32 in a position to partake of the torsional strain within the webs 34 and 36 of the transducer. In order to increase the sensitivity to torsional strain, the gages are mounted preferably in a diagonal manner. It may be further appreciated that when a tensile or compressive force is applied along the axis of the column, or when a bending moment is applied to the column 11, the maximum strain will occur within the webs 34 and 36. By properly positioning the strain gages 38 with respect to the internal perimetric surface of the hole 32 the load transducer will respond accurately to any or all of these types of loads.

Bonding of the strain gages directly to the internal perimetric surface of the hole permits their isolation from the ambient environment by providing soft plugs or elastic caps 17 to cover completely the hole 16 as shown in FIG. 3. The plugs 17 are preferably formed from a readily yieldable, elastomeric material so that they will not tend to rigidify adversely the transducer. Furthermore, a more permanent, protective seal may be obtained by filling the hole completely with a suitable elastomeric material such as a spongy silicone rubber. FIG. 3 also shows a modified plug 17 which includes a multipin connector 15. This arrangement permits the internal connector pins to be permanently connected to the excitation as well as signal terminals of the strain gage elements so that the electronic readout equipment associated with the strain gages may be connected simply and quickly.

Alternatively, as shown in FIGS. 11 and 11A, mechanical enclosing means may be employed by screwing a holding plate 37 to the load cell in the manner shown in FIG. 11 in which the screws 39 are located within the neutral axis of the beam, thereby providing a mechanically strong plug in which the strain gage elements are enclosed without interfering with the flexural qualities of the load column. The holes in the plate 37 may be slightly oversize further to preclude interference with the flexure of the transducer.

A load cell constructed in accordance with my invention is intended to meet the exigencies and requirements of most any situation. For example, one such use may be embodied in a pillow block transducer as might be used in a web tensioning system. A system of this type is shown, somewhat schematically, in FIG. 10 and includes a takeup roll 40 driven by a motor 42 to wind the web of paper, film, or the like 44 onto a roll 40. In systems of this type the tension in the web 44 is controlled frequently by means of a brake (not shown) which acts on the supply roll (not shown) to vary the tension in the web 44. In order to monitor the web tension an idler roll 46 commonly is provided and is rotatably supported on a shaft 48, the ends of which are rotatably mounted in pillow blocks 50. The pillow blocks, in turn, are secured to cantilevered transducers 52 constructed in accordance with my invention. Guide rolls 47 are provided on each side of the idler roll 46 to maintain the desired angle that the web makes with the idler roll 46 as it enters and leaves the idler roll 46. It will be appreciated from the foregoing that as the web passes over and about the various rollers a downwardly directed component of force will be applied to the transducers 52 through the shaft 48 and the pillow blocks 50, thus creating a concentrated bending moment at the narrowed waist portion 54 of the beam mounted transducers. The response of the strain gages bonded within the hole 56 of each transducer 52 may be fed back into the appropriate control unit which governs the braking of the web 44 and/or vary the speed of the windup roll 40. The pillow blocks 50 are supported on transducers such as those shown in FIG. 9 which in turn are mounted rigidly at one end to a rigid surface 60. A stop, such as an adjustable screw 62 may be provided at the bottom of the transducer 52 to limit the extent of bending movement by engagement of the head of the bolt 62 with the surface 60, thus to limit the maximum deflection of the beam and avoid catastrophic permanent distortion or failure.

It will be appreciated that a load transducer of the type described is initially constructed to be responsive to loads in a given range. If, for any reason, the force to be applied to the transducer is outside of this range the sensitivity of the transducer must be adjusted or another transducer of suitable sensitivity be provided to accommodate the changed load. Adjustment of the original transducer normally requires that the strain gages be changed or repositioned on the load transducer. Such modification requires the skill of highly trained technicians and is not performed readily in the field. Additionally, because there are also practical limits set to electronic gain adjustment but also to provide change for the mechanical advantage of the transducer to obtain maximum signal strength for a given situation. This increases the signal-to-noise ratio, gives maximum signal strength which in turn provides freedom from drift and ambients in the indicating and controlling output.

My invention permits the sensitivity of the transducer to be varied mechanically in the field by less skilled personnel and without disturbing the gaging elements or associated electronics. To this end an adjustable "beam mounted" transducer 70, shown in FIG. 11, is provided with a plurality of longitudinally spaced mounting holes 72. The transducer 70 is intended to be rigidly supported at one end, in cantilever fashion, by a pair of bolts or studs 80 which pass through a selected pair of mounting holes 71 and are secured to a rigid supporting surface 82. The load is applied to the other, unsupported end of the beam. It will be appreciated that by selecting properly the holes at which the transducer is supported and to which the load is applied, the sensitivity of the transducer may be varied accordingly. This aspect of my invention is shown as incorporated in the arrangement of FIG. 10 from which it will be seen that the beams 52 are provided with longitudinally spaced mounting holes 72 which permit variable positioning of the pillow blocks 50 along the length of the transducers 52. By varying the position of the pillow blocks 50 the sensitivity of the transducer is varied. Additionally, the sensitivity may be increased by machining or otherwise reducing the thickness of the waist portion of the transducer to increase the stress concentration within the web.

A force transducer constructed in accordance with my invention may be used either singularly or in combination with other, similar force transducers to monitor loads in a wide variety of environments. For example, FIG. 13 illustrates the use of a pair of cantilever, beam mounted transducers 90 arranged to monitor and measure the torque generated by a motor 92. When used in this environment, each of the transducers 90 is secured rigidly, as by bolts 91, to a support 94 with the free ends of the transducers pointing outwardly from the support 94. The motor 92 is supported on a transverse transmission plate 93 which in turn is secured to the free ends of the transducers 90 so that the torque generated by the motor will exert bending moments on the free ends of the transducers 90. The motor should, of course, be oriented with respect to the transducers 90 to provide the most sensitive readings and in most applications this will require that the motor be disposed so that its output shaft axis of rotation lies in parallel relation to the transducers 90. Thus the torque exerted by the motor will apply an upwardly directed bending stress to one of the transducers while simultaneously applying a downwardly directed bending stress to the other transducer as indicated by the arrows 100 and 102. Other applications may require that the motor 92 be mounted with its output shaft disposed normally to the transducers 90 or any other position which one skilled in the art may deem necessary to measure accurately the force in question.

In yet another embodiment of the invention, a transducer of the type described is employed in a viscosimeter shown in FIG. 16. In this arrangement a torsion-sensitive transducer 140, of the type shown in FIGS. 6 and 7, is fixed at one end to a rigid support 142. A paddle 144 is secured to the other end of the transducer 140 and protrudes downwardly into a cylindrical container 146 in which the fluid in question is contained. The container 146 is mounted on a rotary table 148 which, when rotated, will impart a torque to the paddle through the medium of the fluid. The torque exerted on the paddle 144, and hence the transducer 14, is proportional to viscosity of the fluid so that the strain on the transducer provides an indication of the viscosity of the fluid.

From the foregoing it will be appreciated that I have provided a force transducer of simplified construction which is unencumbered by many of the disadvantages and limitations heretofore associated with load columns and force transducers in general.

A transducer constructed in accordance with my invention eliminates the presence of parasitic deflections and, by locating the strain gage elements within the hole formed as an integral part of the transducer provides a naturally protective enclosure for the sensitive strain gage elements. The transducer also displays wide versatility in that it may be "column mounted" to receive the load axially or "beam mounted," either as a conventional beam or a cantilevered beam, so that the load to be measured is applied normally to the longitudinal axis of the transducer thus to eliminate parasitic deflections.

Additionally a transducer of variable sensitivity is provided, which sensitivity may be adjusted with relatively little skill.

It will be understood that my transducer has been illustrated as being incorporated in but a few of its possible environments. The transducer may be used to monitor or measure the magnitude of a force or forces in any number of environments which will be apparent to those skilled in the art. Thus it should be appreciated that the foregoing description is intended to be merely illustrative of the invention, and that other embodiments and modifications thereof will be apparent to those skilled in the art without departing from its spirit.

Having thus described my invention, I claim:
1. A load transducer comprising;
an elongate elastic load carrying beam having a reduced waist portion formed intermediate its ends, the longitudinal axis of said beam extending centrally through said waist portion of said beam;
said beam having a hole formed at the waist portion and extending through said beam, the axis of said hole being disposed normally to the longitudinal axis of said load carrying beam; and
means supporting said beam at one end thereof to receive a force applied thereto in a direction normal to the plane defining said longitudinal axis of said beam and said central axis of said hole to thereby impart a bending stress to said beam along its length, said waist portion being in the unsupported part of said beam,
said bending stress being concentrated at said waist portion and strain gage means associated with the inner perimetric surface of said hole to determine the magnitude of said force.
2. A device as claimed in Claim 1 further comprising:
plug means covering each end of said hole to isolate said hole and sensing means contained therein from the ambient atmosphere,
said plug means being formed from a readily yieldable material so as not to affect appreciably the resilience of said load carrying member.
3. A device as claimed in Claim 1 wherein said reduced waist portion is defined by a pair of opposed concave surfaces formed on said load carrying member, the axis of said hole being disposed between said surfaces at the most narrow region of said waist portion.
4. A device as claimed in Claim 3 further comprising:
plug means covering each end of said hole to isolate said hole and said sensing means contained therein from the ambient environment,
said plug means being formed from a readily yieldable material so as not to affect appreciably the resilience of said load carrying member.
5. A device as defined in Claim 1 further comprising:
plug means covering each end of said hole to isolate said hole and said sensors contained therein from the ambient environment; and
means for fastening said plug means to said load carrying beam said fastening means being located at the neutral axis of said beam so as not to interfere with the structural characteristics of said beam.
6. A device as claimed in Claim 3 further comprising;
plug means covering each end of said hole to isolate said hole and strain gage means contained therein from the ambient environment; and
means for fastening said plug means to said load carrying beam, said fastening means being located at the neutral axis of said beam so as not to interfere with the structural characteristics of said beam.
7. A device as defined in Claim 6 wherein said plug means further includes:
an electrical outlet mounted thereon.
8. A transducer as defined in Claim 1 further comprising:
said beam having notches formed at the internal perimetric surface of said hole in the regions of maximum stress concentration thereby to further increase the stress concentration in said regions,
said strain gage means being nested within said notches to mechanically protect said strain gage means.
9. A load transducer comprising:
an elongate elastic load carrying beam having a reduced waist portion formed intermediate its ends, said reduced waist portion being formed symmetrically about the longitudinal axis of said beam;
said beam having a hole formed at said waist portion and extending through said beam, the axis of said hole being disposed normally and in intersecting relation to the longitudinal axis of said beam;

means for supporting rigidly one end of said beam whereby when a force is applied to said beam along a direction that is normal to the plane defined by the longitudinal axis of said beam and the central axis of said hole said force may apply a bending stress to said beam, the resultant strain being concentrated at said reduced waist portion; and means for varying the longitudinal spacing at which said beam is supported thereby to control the strain at said waist portion whereby the sensitivity of said transducer may be varied.

10. A method of measuring the magnitude of a force comprising:

providing an elongate elastic load carrying beam having a reduced waist portion intermediate its ends and a hole formed through said waist portion, the axis of said hole being disposed normally and in intersecting relation to the longitudinal axis of said beam;

supporting said beam at one end thereof with said reduced waist portion being in the unsupported part of said beam so that said force acts on the unsupported portion of said beam in a direction substantially normal to the plane defined by said longitudinal axis of said beam and said axis of said hole whereby a bending stress is applied to said beam;

measuring the strain of said beam in response to said bending stress at the interior perimetric surface of said hole.

11. A method as claimed in claim 10 wherein said strain at the interior perimetric surface of said hole is measured at a location most distant from said longitudinal axis of said beam.

12. A transducer as defined in claim 1 further comprising:

said beam having notches formed at the internal perimetric surface of said hole in the regions of maximum stress concentration thereby to further increase the stress concentration in said regions, said strain gage means being nested within said notches to mechanically protect said strain gage means 13. A pillow block transducer for supporting a shaft rotatable within a pillow block comprising:

an elongate, elastic, load-carrying beam having a reduced waist portion formed intermediate its ends, said reduced waist portion being formed symmetrically about the longitudinal axis of said beam;

said member having a hole formed at said waist portion and extending through said beam, the axis of said hole being disposed normally and at intersecting relation to the longitudinal axis of said beam;

means for supporting rigidly one end of said beam whereby when a force is applied to the other end of said beam along a direction that is normal to the plane defined by the longitudinal axis of said beam and the central axis of said hole, said force will apply a bending stress to said beam, the resultant strain being concentrated at said reduced waist portion;

strain gage means operatively associated with the internal perimetric surface of said hole and being so constructed and arranged as to provide an indication of the magnitude of strain generated at said reduced waist portion;

means mounting said pillow block to the free, other end of said beam.

14. A transducer as defined in Claim 13 further comprising:

means for varying, lengthwise of said transducer, the position at which said pillow block is mounted to said free other end of said transducer.

15. A torque responsive transducer comprising:

a pair of elongate, elastic, load-carrying beams, each of said beams having a reduced waist portion formed intermediate its ends, said reduced waist portions being formed symmetrically about the longitudinal axis of said beam;

each of said members having a hole formed at said waist portion and extending through said beam, the axis of each of said holes being disposed normally and in intersecting relation to the longitudinal axis of its associated beam;

means for supporting rigidly one end of each of said beams so that the longitudinal axes of said beams are parallel to each other;

a transmission plate extending normally to the axes of said beams, the ends of said transmission plate being secured to the other, free end of each beams, whereby a torque applied to said transmission plate between said beams will cause said beams to bend in predetermined directions; and means for sensing the magnitude of strain generated at the internal perimetric surface of each of said holes.

16. A transducer as defined in claim 1 wherein said sensing means comprises:

at least two electrodes;

means mounting said at least two electrodes, in insulative relation, to the internal perimetric surface of said hole with a space defined between said at least two electrodes, said electrodes being oriented such that said space therebetween will vary in response to flexure of said transducer, whereby when an electric potential is applied across said electrodes the capacitance therebetween may vary in response to said flexure of said transducer.

17. A transducer as defined in claim 16 wherein said electrodes comprise:

a first, ground electrode extending into said hole in a direction substantially normal to the longitudinal axis of said load carrying member;

a second electrode on one side of and spaced from said first electrode; and a third electrode on the other side of and spaced from said first electrode.

18. A transducer as defined in claim 16 wherein said electrodes comprise:

at least three wedge-shaped electrodes mounted to the internal surface of said hole so that adjacent side edges of adjacent wedges define a space therebetween, whereby flexure of said load carrying column may effect dimensional variation of said spaces.

19. A transducer as defined in Claim 18 wherein said insulative mounting comprises:

a insulative ring secured to the internal perimetric surface of said hole;

said wedge-shaped electrodes being mounted to the internal perimetric surface of said ring.

20. A load transducer comprising:

an elongate elastic load carrying beam of circular cross section having a reduced waist portion formed intermediate its ends, the longitudinal axis of said beam extending centrally through said waist portion of said beam;

said beam having a hole formed at the waist portion and extending through said beam, the axis of said hole being disposed normal to the longitudinal axis of said beam; and means supporting said beam to receive a torsional force applied thereto in a direction around the longitudinal axis of said beam to thereby impart a torsional stress to said beam, said torsional stress being concentrated at said waist portion, and strain gages associated with the inner perimetric surface of said hole to determine the magnitude of said force.

21. A transducer as defined in claim 20 further comprising:

means orienting said strain gages diagonally within said hole to increase the sensitivity of said transducer to torsional stresses applied thereto.